Patented Mar. 27, 1945

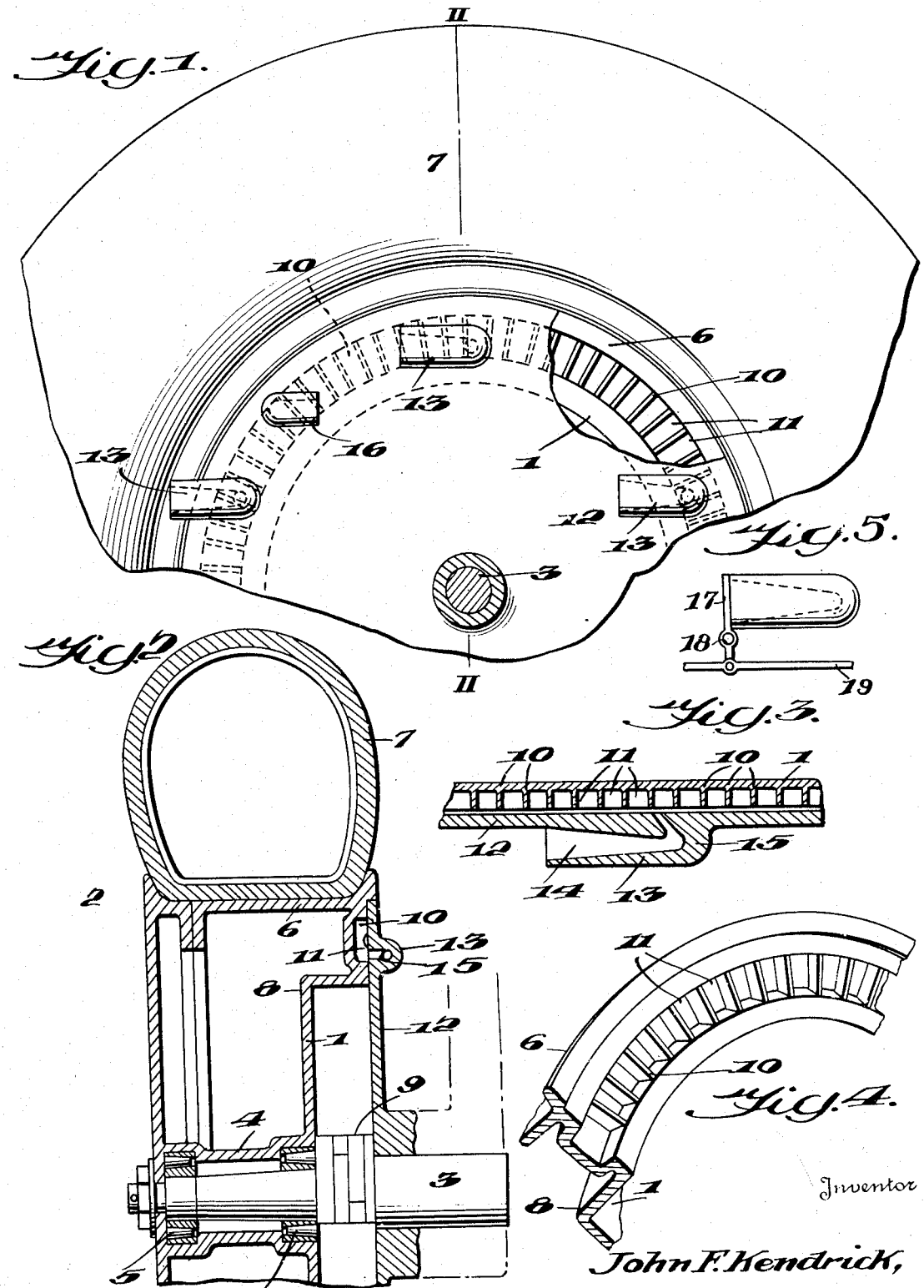

2,372,207

UNITED STATES PATENT OFFICE 2,372,207

AIRPLANE LANDING GEAR

John F. Kendrick, Columbus, Ohio

Application September 8, 1942, Serial No. 457,681

7 Claims. (Cl. 244—103)

This invention relates to airplane landing gear, and, more particularly, to the wheel construction thereof.

A general object of the invention is to provide improved means for causing positive rotation of the rubber-tired landing wheels of an airplane prior to the actual engagement of such wheels with the ground.

It has been recognized that excessive wear of the rubber tires of airplane landing wheels occurs as a result of the frictional scraping or dragging of the tires over the ground immediately after the airplane alights and until the time the rotational speed of the wheels is equivalent to that of the forward movement of the plane. During flight, the wheels are stationary and when the airplane descends its ground speed is quite high. It is therefore evident that frictional drag of the wheels over the ground surface is produced, causing undesirable tire wear.

To effect the rotation of the ground wheels during flight various proposals have been made, such as providing the side walls of the tires with moulded pockets or vanes which, by the action of air pressure thereon, causes the wheels to rotate. It has also been proposed to employ spring actuated motors for effecting positive rotation of the wheels. Such earlier proposals are considered to be impractical for various reasons, and, in general, have not been commercially adopted. Many of such early constructions are objectionable from the standpoint of weight, undesirable mechanical complication, difficult and expensive to manufacture or ineffective for carrying out their intended purposes.

It is, therefore, the principal aim of the present invention to provide simple, positive and efficient means for producing rotation of the landing wheels of an airplane during flight or immediately prior to landing, the same being carried out by incorporating in the body of each wheel, independently of the tires thereon, a series of enclosed turbine blades or vanes, air being taken from the atmosphere and by the forward motion of the plane during flight passed at high velocity through one or more restricted streams into impinging contact with said blades or vanes, whereby to effect the rotation of said wheels in a direct yet simplified manner.

For a further understanding of the invention, reference is to be had to the following description and the accompanying drawing, wherein:

Fig. 1 is a fragmentary front elevational view of an airplane landing wheel constructed in accordance with the present invention;

Fig. 2 is a vertical transverse sectional view, the plane of the figure being indicated by the line II—II of Fig. 1;

Fig. 3 is a detail horizontal setcional view on the line III—III of Fig. 1;

Fig. 4 is a fragmentary perspective view of a portion of the wheel body disclosing the turbine vanes or blades therein;

Fig. 5 is a detail side elevational view disclosing a modified form of the invention wherein a shutter control is provided for the air inlet nozzles.

Referring more particularly to the drawing and to the specific embodiment of the invention therein illustrated, the numeral 1 designates the metallic body of a landing wheel 2 of an airplane. The numeral 3 designates the strut-supported stud axle on which the wheel 2 is mounted for rotation, the hub 4 of the wheel being supported from the axle on anti-friction, thrust-absorbing bearings 5. The struts employed to effect the support of the axle and its associated wheel may be of the fixed type or of the so-called retractile type, as may be readily understood. The outer portion of the wheel body is formed with the usual felly or rim 6 for the reception of an inflatable tire 7. The inner face of the wheel body 1 is recessed, as usual, as at 8, for the reception of internal brake mechanism 9. Thus, the wheel body, its mounting, and associated tire are of standard construction and may be any one of the many types now in use on airplanes.

The distinguishing feature of the present invention resides in providing preferably the inner side of the wheel body 1 contiguous to the rim 6 with an annular series of milled-out, turbine blades or vanes 10, between which pockets 11 are formed. For convenience in illustration, these blades have been shown as of the straight radial type. However, it will be appreciated that the shape of these blades may be changed as may be found desirable, in which the blades may be of a curved type, constituting crescents or segments. In fact, any standard turbine shape may be used. The pockets 11 are covered by the usual stationary disk or closure plate 12 mounted contiguous to the inner side of the wheel body on the axle 3. In this instance, the said disk or plate is provided with air inlet nozzles 13, each shaped, as shown in Fig. 3, to provide an inwardly converging passage 14 which terminates in an angularly and forwardly directed restricted throat 15.

When the landing gear is lowered, assuming that a retractile landing gear is used, preparatory to the landing of an airplane in flight, it will be seen that air will enter the passage 14 and will issue at high velocity from the throat 15 of the passage 14, impinging the blades or vanes 10 of the wheel body and thereby causing the positive rotation of the wheel. Air may be discharged from the turbine region of the wheel through outlets or exhausts 16 suitably spaced from the inlet nozzles 13.

From the foregoing, it will be seen that the present invention provides a highly simplified, yet efficient means for rotating such landing wheels. The mechanism employs no added parts to the wheel structure nor does it increase substantially its weight or add materially to its normal cost. In carrying out the invention, it is merely necessary to form in the conventional side wall of the wheel body suitably shaped turbine blades or vanes, which can be conveniently accomplished by a milling machine operation, or by moulding or pressing the same therein. Of course, the blades or vanes may be formed in a separate rim adapted to be secured to the wheel body. The nozzles 13 and 16 may then be formed in the customary plate used in the mounting of the brake mechanism. Thus, the construction does not add any moving or other parts to a conventional wheel design for airplanes. The proportions of the inlet passages 14 and 15 may be varied to secure the desired rotational speed of the wheel.

Also, it is within the scope of the invention to provide adjustable shutter means for opening and closing the air inlet ends of the nozzle passages 14. This may be desirable when an airplane is in normal flight to hold the landing wheels against rotation for the purpose of minimizing wear on wheel axles and bearings. Such a means has been shown at 17 in Fig. 5, wherein a shutter plate is pivotally mounted as at 18 on the disk 12 and is adapted to be moved by a control ring 19. This ring may be either manually operated from the pilot's position or may be automatically operated through the lowering of the associated landing gear.

The inlet and outlet nozzles 13 and 16 are so arranged as to avoid any back pressure on the turbine blades, the arrangement thereof being such that, if anything, the negative pressures will exist in the exhaust passages to assist in the removal of the air following its exertion of kinetic energy on the blades. While I have shown the wheel having but one side thereof formed with air turbine means, nevertheless, it will be understood that such means may be applied to both sides of the wheel if it should be found desirable.

Obviously, therefore, the mechanism here disclosed is subject to considerable variation and modification without departing from the fundamental teachings of my invention, and I therefore reserve the right to employ all such modifications that may be said to fall fairly within the scope of the following claims.

What I claim is:

1. An airplane landing gear, a wheel having a tire-receiving body, turbine blades provided circumferentially on at least one side of said body, a relatively stationary closure disposed adjacent to said blades, and alternately arranged and oppositely facing air inlet and exhaust means formed with said closure in communication with said blades.

2. Landing wheel construction for airplanes comprising an axle, a tire-receiving wheel body rotatably mounted upon said axle, a circularly disposed row of turbine blades formed on at least one side of said body contiguous to the tire-receiving perimeter thereof, a relatively stationary closure disposed adjacent to said blades, and alternately arranged and oppositely facing air inlet and exhaust means formed with said closure and operative during the flight of an associated airplane to direct confined air streams on said blades to cause positive rotation of said wheel and the exhaust of such streams to the atmosphere.

3. In airplane landing gear, a ground-engaging wheel having a tire-receiving body, propeller blades provided circumferentially on at least one side of said body between the axle for the wheel and its outer tire-receiving perimeter, a stationary closure disposed adjacent to said blades, a forwardly facing air inlet nozzle formed with the outer side of said closure and adapted to direct impinging air streams on said impeller blades during flight of an associated airplane, whereby to cause positive rotation of said wheel, and a rearwardly facing exhaust nozzle formed with said closure for exhausting air from said impeller blades and discharging the same to the atmosphere.

4. In airplane landing gear, a rotatably supported ground-engaging wheel, said wheel comprising a hub, a tire-receiving rim and side walls disposed between said hub and rim, a plurality of impeller blades stationarily disposed in a circular groove provided in one of said side walls, a stationary closure member disposed immediately adjacent to the open side of said groove, and alternately arranged and oppositely facing air inlet and exhaust passages formed in conjunction with said closure member in communication with said groove.

5. In airplane landing gear, a ground-engaging wheel having an axle-receiving hub, a tire-receiving rim and side walls uniting said hub and rim, at least one of said side walls being circularly recessed, spaced impeller blades mounted within said recess, a relatively stationary closure member mounted adjacent to said recessed side wall, and a plurality of spaced alternately arranged air inlet and exhaust nozzles formed with said closure member for effecting the introduction of air streams under high velocity flow into said recess for impinging contact with said blades and the exhaust of air from said recess said inlet nozzles facing in a forward direction and said exhaust nozzles in a rearward direction.

6. In airplane landing gear, a wheel having a tire-receiving body, a plurality of impeller vanes arranged in circular order on at least one of the side walls of said body adjacent to its outer perimeter, a relatively stationary closure member arranged adjacent to said vanes, and a plurality of substantially horizontally disposed, alternately situated air inlet and discharge nozzles carried by said closure member, the air inlet ends of said inlet nozzles being forwardly faced and the air outlet ends of the discharge nozzles rearwardly faced.

7. In airplane landing gear, a wheel having a tire-receiving body, a plurality of impeller vanes arranged in circular order on at least one of the side walls of said body adjacent to its outer perimeter, a relatively stationary closure member arranged adjacent to said vanes, and a plurality of substantially horizontally disposed, alternately situated air inlet and discharge nozzles carried by said closure member, the air inlet ends of said inlet nozzles being forwardly faced and the air outlet ends of the discharge nozzles rearwardly faced, said nozzles being disposed in relatively spaced circular order around the closure member with the internal air passages of said nozzles disposed in open air flow communication with said vanes.

JOHN F. KENDRICK.